United States Patent
Nakane et al.

(10) Patent No.: US 6,242,046 B1
(45) Date of Patent: Jun. 5, 2001

(54) STAINPROOF-TREATING AGENT, METHOD FOR STAINPROOF-TREATING AND STAINPROOF-TREATED ARTICLE

(75) Inventors: Yoshinori Nakane, Ayase; Shun Saito, Yokohama; Akihiro Osuka, Yokohama; Kishio Shibato, Yokohama, all of (JP)

(73) Assignee: BASF NOF Coatings Company, Limited, Tokyo (JP)

( * ) Notice: Subject to any disclaimer, the term of this patent is extended or adjusted under 35 U.S.C. 154(b) by 0 days.

(21) Appl. No.: 09/446,249

(22) PCT Filed: Apr. 21, 1999

(86) PCT No.: PCT/JP99/02108

§ 371 Date: Dec. 20, 1999

§ 102(e) Date: Dec. 20, 1999

(87) PCT Pub. No.: WO99/54414

PCT Pub. Date: Oct. 28, 1999

(30) Foreign Application Priority Data

Apr. 21, 1998 (JP) .................................................. 10-125383
Aug. 6, 1998 (JP) .................................................. 10-233485
Feb. 17, 1999 (JP) .................................................. 11-039074

(51) Int. Cl.[7] ................................ B05D 3/02; B05D 3/10
(52) U.S. Cl. ...................... 427/354; 427/374.1; 427/378; 427/387; 427/388.1; 427/388.4
(58) Field of Search ................................ 427/387, 388.1, 427/388.4, 354, 374.1, 378

(56) References Cited

FOREIGN PATENT DOCUMENTS

| 4-173882 | * | 6/1992 | (JP) . |
|---|---|---|---|
| 7-109435 | | 4/1995 | (JP) . |
| 8-12943 | | 1/1996 | (JP) . |
| 8-311398 | * | 11/1996 | (JP) . |
| 9-220524 | | 8/1997 | (JP) . |
| 10-88037 | | 4/1998 | (JP) . |
| 10-279885 | | 10/1998 | (JP) . |
| 94/06870 | | 3/1994 | (WO) . |
| 97/13809 | * | 4/1997 | (WO) . |

* cited by examiner

Primary Examiner—Erma Cameron
(74) Attorney, Agent, or Firm—Levy & Grandinetti

(57) ABSTRACT

The present invention relates to a stainproof-treating agent which comprises (A) 0.05 to 30 percent by weight of a nonvolatile resin ingredient, (B) 0.05 to 30 percent by weight of a nonvolatile ingredient of at least one oxide sol selected from the group consisting of an aluminum oxide sol, a silica sol, a zirconium oxide sol and an antimony oxide sol, (C) 1 to 50 percent by weight of an organic solvent and (D) 40 to 99 percent by weight of water, wherein the resin of the ingredient (A) has a solubility parameter of 10 or more and is insoluble in water at 25° C., a method for stainproof-treating by using the stainproof-treating agent and a stainproof-treated article obtained by the method for stainproof-treating. The stainproof-treating agent of the present invention can be applied on a substrate without requiring a special device and can provide excellent stain resistance by modifying a substrate surface hydrophilic by a simple work. Also, the method for stainproof-treating of the present invention can provide excellent stain resistance on the substrate by a simple work. Further, the stainproof-treated article of the present invention is an article obtained by the method for stainproof-treating described above and is excellent in stain resistance.

26 Claims, No Drawings

STAINPROOF-TREATING AGENT, METHOD FOR STAINPROOF-TREATING AND STAINPROOF-TREATED ARTICLE

FIELD OF TECHNOLOGY

The present invention relates to a stainproof-treating agent, a method for stainproof-treating and a stainproof-treated article. More particularly, it relates a stainproof-treating agent, which is applied on a substrate, in particular a paint film on an outside plate of automobile, so that stain resistance is provided to the substrate by modifying the surface of the substrate hydrophilic and the frequency of maintenance such as washing can be decreased, a method for stainproof-treating by using the stainproof-treating agent and a stainproof-treated article treated by the method for stainproof-treating.

BACKGROUND TECHNOLOGY

Various stain materials such as discharged materials from factories and automobiles, droppings of fouls, saps or pollens adhere to paint films such as paint films on outside plates of automobile, which are exposed with rain and wind in outdoor, so that the appearances are gradually damaged. Therefore, in order to maintain the initial appearance of the paint film, it is necessary to perform the maintenance such as washing at high frequency.

For the purpose to decrease the frequency of maintenance, a wax film has been formed on the paint film in recent years. A wax agent forming the wax film generally comprises a wax ingredient for forming the film and giving water repellency, a silicone ingredient for providing gloss and making the wiping out easy, and an organic solvent for functioning as solvent or dispersing medium of the ingredients. After the wax agent is applied on the paint film by sponge and the like, the wax film is formed by wiping out excess wax agent with soft cloth and the like and polishing up the paint film. But, though the wax film gives gloss to the paint film, the wax film is repellent so that rain drops containing stain materials contracts on the wax film. Therefore, the stain materials is condensed partially and when the rain water is dried, mottling is formed on the paint film of a horizontal plane and rain line traces are formed on the paint film of a vertical plane. Further, the wax film is softer than the paint film so that the adhered stain materials are buried in it and it is difficult to remove the stain materials by natural actions such as wind and rain. That is, even if the wax film is formed on the paint film, there are not actually effects to decrease the maintenance frequency.

For achieving the foregoing objects, a coating composition formulating a specific organosilicate and/or a condensate thereof in a specific organic coating composition was suggested(Publication of unexamined International Application WO 94/06870). Also , the present inventors suggested a thermosetting composition comprising a resin ingredient, a curing agent ingredient and a dispersion of inorganic sol (Publication of unexamined International Application WO 97/13809), for achieving the foregoing objects. And, the paint films obtained from the compositions have stain resistance because the organosilicate and/or a condensate thereof or the inorganic particle is oriented on the surface of paint film and the paint film is modified to hydrophilicity. Accordingly, the object to decrease the maintenance frequency is achieved. But, because the compositions are a invention on the assumption of industrial applications, the compositions contain usually large amount of the organic solvent and a special coating device is required in using the compositions. When a part of the paint films obtained from the compositions is cut deep for some reason, the organosilicate and/or a condensate thereof or the inorganic particle is dropped form the paint film surface according to circumstances, so that there are a problem that only the part is stained. So, a stainproof-treating agent and a method for stainproof-treating for repairing it easily are required.

For the objects, an outdoor article having a paint film surface of 102 or more in octane contact angle, which is obtained by applying a surface-treating agent comprising a silicon compound and a film-making ingredient of a fluororesin, was suggested (Japanese patent kokai publication hei 7-109435). However, the outdoor article is insufficient in stain resistance according to circumstances. Also, a coating agent for paint film, in which a powder of metal oxide having light catalytic action is mixed into a base material comprising a wax ingredient as main component, was suggested (Japanese patent kokai publication hei 9-220524). However, in order to form the film of the coating agent, working for wiping up excess coating agent and polishing the film are required after applying the coating agent on the paint film. Further, a stainproof-treating agent which can provide stain resistance to the substrate by simple working and a simple method for stainproof-treating are required.

The present invention accordingly has an object to provide a stainproof-treating agent, which can be applied on a substrate without requiring a special device, can provide stain resistance to the substrate by modifying the surface of the substrate hydrophilic according to simple working, and can decrease easily the frequency of maintenance such as washing, a simple method for stainproof-treating performed by using the stainproof-treating agent and a stainproof-treated article treated by the method for stainproof-treating.

Extensive investigations undertaken by the present inventors with the objects described above lead to a discovery that the objects can be achieved by a stainproof-treating agent: which comprises (A) a specific resin ingredient, (B) a specific oxide sol ingredient, (c) an organic solvent and (D) water in specific formulation ratio.

DISCLOSURE OF INVENTION

The present invention provides a stainproof-treating agent which comprises (A) 0.05 to 30 percent by weight of a nonvolatile resin ingredient, (B) 0.05 to 30 percent by weight of a nonvolatile ingredient of at least one oxide sol selected from the group consisting of a silica sol, an aluminum oxide sol, an antimony oxide sol, a zirconium oxide sol, a tin oxide sol and a titania sol, (C) 1 to 50 percent by weight of an organic solvent and (D) 40 to 99 percent by weight of water, wherein the resin of ingredient(A) has a solubility parameter value of 10 or more and is insoluble in water at 25° C.

The present invention provides the stainproof-treating agent described above, wherein the resin of ingredient (A) has at least one hydrophilic functional group selected from the group consisting of hydroxyl group, carboxyl group, amino group, imino group and amide group and the total amount of the hydrophilic functional group is 4 or more mole per 1000 g of the resin.

The present invention provides the stainproof-treating agent described above, wherein the resin of ingredient (A) is a polymer of a polymerizable double bond-containing monomer, which does not have a fluorine atom, and have a number average molecular weight of 2000 or more.

The present invention provides the stainproof-treating agent described above, wherein the oxide sol of ingredient (B) is treated with a silane coupling agent.

The present invention provides a method for stainproof-treating which comprises applying the stainproof-treating agent described above on a substrate and drying the substrate.

The present invention provides the method for stainproof-treating described above, wherein after applying the stainproof-treating agent on the substrate, the substrate is washed with water and then dried.

The present invention provides a method for stainproof-treating which comprises, in a process for washing an automobile by an automobile washing device, applying the stainproof-treating agent described above by sprinkling on an external panel of automobile after automobile-washing work, washing the substrate with water by water sprinkling and drying the substrate by air blowing.

Also, the present invention provides a method for stainproof-treating which comprises, in a process for obtaining a cured article of a thermosetting composition, cooling the cured article by using the stainproof-treating agent described above as a cooling liquid in cooling after heating and curing the thermosetting composition.

Further, the present invention provides a method for stainproof-treating which comprises, in a process for obtaining a formed article of a thermoplastic composition, cooling the formed article by using the stainproof-treating agent described above as a cooling liquid in cooling after heat forming of the thermoplastic composition.

Furthermore, the present invention provides a stainproof-treated article which is treated by any one of the methods described above.

Other and further objects, features and advantages of the invention will appear more fully from the following description.

PREFERABLE EMBODIMENT FOR PRACTICING THE INVENTION

The stainproof-treating agent of the present invention comprises (A) 0.05 to 30 percent by weight of a nonvolatile resin ingredient, (B) 0.05 to 30 percent by weight of a nonvolatile ingredient of at least one oxide sol selected from the group consisting of a silica sol, an aluminum oxide sol, an antimony oxide sol, a zirconium oxide sol, a tin oxide sol and a titania sol, (C) 1 to 50 percent by weight of an organic solvent and (D) 40 to 99 percent by weight of water.

The resin used as ingredient(A) is utilized to fix the particles of the oxide on the surface of the substrate while inhibiting aggregation of the particles of the oxide, in applying the stainproof-treating agent on the substrate and drying the substrate. The resin is not limited particularly and includes various resins, so long as the resin can achieve the foregoing objects and does not prevent the dispersing of the particles of the oxide in the stainproof-treating agent of the present invention.

The resin of ingredient(A) is formulated in the range of 0.05 to 30 percent by weight, preferably 0.1 to 25 percent by weight, as nonvolatile ingredient in the stainproof-treating agent of the present invention. When the amount of the nonvolatile ingredient is less than 0.05 percent by weight, the particles of the oxide may be not fixed on the surface of the substrate. Also, when the amount of the nonvolatile ingredient is more than 30 percent by weight, the nonuniformity of the drying may be left on the surface of the substrate in drying of the stainproof-treating agent.

The resin of the ingredient(A) has a solubility parameter of 10 or more and is insoluble in water at 25° C. When the solubility parameter value of the resin is less than 10, the dispersing of the particles of the oxide may be prevented and the aggregation of the particles of the oxide may be occurred in drying of the stainproof-treating agent. Further, when the resin is soluble in water at 25° C., the particles of the oxide arranged on the surface of the substrate may be removed together with the resin by rain water. The solubility parameter value is preferably 10.1 to 15.0.

The solubility parameter value is a barometer of the solubility. The measuring method is as follows. The measuring temperature is 20° C.

Method A (when the resin is soluble in acetone at 20° C.)
① Into a 100 ml beaker, 0.5 g of the resin is placed and weighed, 10 ml of acetone is added by a transfer pipet, and the resin is dissolved by a magnetic stirrer.
② N-hexane is dropped into the beaker by a 50 ml biuret and the dropping amount is measured at the point that a turbidity is occurred.
③ The same operations as ① and ② are carried out by using ion-exchange water instead of n-hexane. ④ The solubility parameter value δ is calculated by the following formula.

$$\delta = (VmH^{1/2} \cdot \delta mH + VmW^{1/2} \cdot \delta mW)/(VmH^{1/2} + VmW^{1/2})$$

$$Vm = V1V2/(\phi1 \cdot V2 + \phi2 \cdot V1)$$

$$\delta m = \phi1 \cdot \delta1 + \phi2 \cdot \delta2$$

Vi: molecular volume of solvent (ml/mole)
φi: volume fraction of each solvent at the point of turbidity
δi: solubility parameter value of solvent
VmH: Vm of n-hexane mixture system
VmW: Vm of ion-exchange water mixture system
δmH: δm of n-hexane mixture system
δmw: δm of ion-exchange water mixture system Method B (when the resin is insoluble in acetone but soluble in dimethyl sulfoxide at 20° C.)
① Into a 100 ml beaker, 0.5 g of the resin is placed and weighed, 10 ml of dimethyl sulfoxide is added by a transfer pipet, and the resin is dissolved by a magnetic stirrer.
② Acetone is dropped into the beaker by a 50 ml biuret and the dropping amount is measured at the point that a turbidity is occurred.
③ The same operations as ① and ② are carried out by using ion-exchange water instead of acetone.
④ The solubility parameter value δ is calculated by the following formula.

$$\delta = (VmA^{1/2} \cdot \delta mA + VmW^{1/2} \cdot \delta mW)/(VmA^{1/2} + VmW^{1/2})$$

$$Vm = V1 \cdot V2/(\phi1 \cdot V2 + \phi2 \cdot V1)$$

$$\delta m = \phi1 \cdot \delta1 + \phi2 \cdot \delta2$$

Vi: molecular volume of solvent (ml/mole)
φi: volume fraction of each solvent at the point of turbidity
δ: nsolubility parameter value of solvent
VmA: Vm of acetone mixture system
VmW: Vm of ion-exchange water mixture system
δmA: δm of acetone mixture system
δmW: δm of ion-exchange water mixture system More preferable resins of ingredient(A) include resins having at least one hydrophilic functional group selected from the group consisting of hydroxyl group, carboxyl group, amino group, imino group and amide group and the total amount of the hydrophilic functional group of 4 or more mole per 1000 g of the resin. The hydroxyl group is restricted to that bonded directly to a carbon atom and differs from hydroxyl group bonded to a silicon atom, i.e. a silanol group. Also, with respect to carboxyl group, amino group, imino group and amide group other than hydroxyl group, these groups bonded to a carbon atom are preferable. The total amount of the hydrophilic functional group is preferably 4.5 or more mole per 1000 g of the resin, and more preferably 5 or more mole per 1000 g of the resin. When the total amount of the hydrophilic functional group is less than 4 mole per 1000 g of the resin, the dispersing of the particles of the oxide may be prevented and the aggregation of the particles of the oxide may be occurred in drying of the stainproof-treating agent, and the particles of the oxide may be prevented to fix on the surface of the substrate. Therefore, the development term of stainproof-treating effects may be decreased. The upper limitation of the total amount of the hydrophilic functional group is not limited particularly and is preferably 25 or less mole per 1000 g of the resin.

The hydrophilic functional group can be utilized singly or in combination of two or more members.

More preferable hydrophilic functional groups are hydroxyl group, carboxyl group or amide group and the total amount of the hydrophilic functional group is most preferably 5 to 25 mole per 1000 g of the resin.

Preferable examples of the resins of ingredient(A) include a polymer of a polymerizable double bond-containing monomer and a polyester resin including an alkyd resin. The resins can be utilized singly or in combination of two or more members.

The polymerizable double bond-containing monomer include, for example, (meth)acrylic acid esters of alkyl alcohols such as methyl methacrylate, ethyl methacrylate, n-propyl methacrylate, isopropyl methacrylate, n-butyl methacrylate, isobutyl methacrylate, t-butyl methacrylate, pentyl methacrylate, hexyl methacrylate, cyclohexyl methacrylate, 2-ethylhexyl methacrylate, adamantyl methacrylate, dodecyl methacrylate, isobornyl methacrylate, methyl acrylate, ethyl acrylate, n-propyl acrylate, isopropyl acrylate, n-butyl acrylate, isobutyl acrylate, t-butyl acrylate, pentyl acrylate, hexyl acrylate, cyclohexyl acrylate, 2-ethylhexyl acrylate, adamantyl acrylate, dodecyl acrylate and isobornyl acrylate; hydroxyl group-containing monomers such as 2-hydroxyethyl methacrylate, 2-hydroxypropyl methacrylate, 3-hydroxypropyl methacrylate, 3-hydroxybutyl methacrylate, 4-hydroxybutyl methacrylate ε-caprolactone adduct of 2-hydroxyethyl methacrylate, ethylene oxide and/or propylene oxide adduct of 2-hydroxyethyl methacrylate, 2-hydroxyethyl acrylate, 2-hydroxypropyl acrylate, 3-hydroxypropyl acrylate, 3-hydroxybutyl acrylate, 4-hydroxybutyl acrylate ε-caprolactone adduct of 2-hydroxyethyl acrylate, ethylene oxide and/or propylene oxide adduct of 2-hydroxyethyl acrylate, 2-hydroxyethyl crotonate 2-hydroxypropyl crotonate, 3-hydroxypropyl crotonate, 3-hydroxybutyl crotonate, 4-hydroxybutyl crotonate, 5-hydroxypentyl crotonate, 6-hydroxyhexyl crotonate, allyl alcohol, hydroxymethyl vinyl ether, hydroxyehtyl vinyl ether, hydroxypropyl vinyl ether, hydroxybutyl vinyl ether, hydroxypentyl vinyl ether, hydroxyhexyl vinyl ether, hydroxyheptyl vinyl ether and hydroxycyclohexyl vinyl ether; carboxyl group-containing monomers such as methacrylic acid, acrylic acid, itaconic acid, mesaconic acid, maleic acid, fumaric acid, ω-carboxy-polycaprolactone(n=2) monoacrylate(for example, ARONIXM-5300, trade name, produced by TOAGOSEI Co., LTD.), phthalic acid monohydroxyethyl acrylate (for example, ARONIX M-5400, trade name, produced by TOAGOSEI Co., LTD.) and acrylic acid dimer (for example, ARONIX M-5600, trade name, produced by TOAGOSEI Co., LTD.); amide group-containing monomers such as methacrylamide, acrylamide, N,N-dimethyl methacrylamide, N,N-dimethyl acrylamide, N,N-dimethyl aminopropyl acrylamide, N-isopropyl acrylamide and N,N-diethyl acrylamide; epoxy group-containing monomers such as glycidyl methacrylate, glycidylacrylate, 3,4-epoxycyclohexylmethylmethacrylate, 3,4-epoxycyclohexylmethyl acrylate, allylglycidyl ether, p-glycidyloxy styrene, p-glycidyloxy-α-methyl styrene, p-(3,4-epoxycyclohexylmethyloxy) styrene, p-(3,4-epoxycyclohexylmethyloxy)-α-methyl styrene, glycidyl ethylene, 3,4-epoxycyclohexylmethylethylene, glycidylvinyl ether, 3,4-epoxycyclohexylmethyl vinyl ether and 3,4-epoxycyclohexylmethyl allyl ether; oxazoline group-containing monomers such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline; cyclocarbonate group-containing monomers such as 3-acryloyloxypropylene carbonate and 3-methacryloyloxypropylene carbonate; aliphatic vinyl ethers such as ethyl vinyl ether, isopropyl vinyl ether, n-propyl vinyl ether, n-butyl vinyl ether, isobutyl vinyl ether, 2-ethylhexyl vinyl ether and cyclohexyl vinyl ether; crotonic acid alkyl esters such as methyl crotonate, ethyl crotonate and propyl crotonate; aliphatic carboxylic acid vinyl esters such as vinyl acetate, vinyl propionate, vinyl butyrate, vinyl pivalate, vinyl caproate, vinyl caprylate, vinyl caprate, vinyl laurate and vinyl stearate; alicyclic carboxylic acid vinyl esters such as vinyl cyclohexanecarboxylate; aromatic carboxylic acid vinyl esters such as vinyl benzoate, vinyl cinnamate and vinyl p-t-butyl benzoate; olefins such as ethylene, propylene, butylene, isoprene and chloroprene; fluorine-containing monomers such as $CF_2=CF_2$, $CHF=CF_2$, $CH_2=CF_2$, $CH_2=CHF$, $CClF=CF_2$, $CHCl=CF_2$, $CCl_2=CF_2$, $CClF=CClF$, $CHF=CCl_2$, $CH_2=CClF$, $CCl_2=CClF$, $CF_3CF=CF_2$, $CF_3CF=CHF$, $CF_3CH=CF_2$, $CF_3CF=CH_2$, $CHF_2CF=CHF$, $CH_3CF=CF_2$, $CH_3CF=CH_2$, $CF_2ClCF=CF_2 CF_3CCl=CF_2$, $CF_3CF=CFCl$, $CF_2ClCCl=CF_2$, $CF_2ClCF=CFCl$, $CFCl_2CF=CF_2$, $CF_3CCl=CClF$, $CF_3CCl=CCl_2$, $CClF_2CF=CCl_2$, $CCl_3CF=CF_2$, $CF_2ClCCl=CCl_2$, $CFCl_2CCl=CCl_2$, $CF_3CF=CHCl$, $CClF_2CF=CHCl$, $CF_3 CCl=CHCl$, $CHF_2CCl=CCl_2$, $CF_2ClCH=CCl_2$, $CF_2ClCCl=CHCl$, $CCl_3CF=CHCl$, $CF_2ClCF=CF_2$, $CF_2BrCH=CF_2$, $CF_3CBr=CHBr$, $CF_2ClCBr=CH_2$, $CH_2BrCF=CCl_2$, $CF_3CBr=CH_2$, $CF_3CH=CHBr$, $CF_2BrCH=CHF$, $CF_2BrCF=CF_2$, $CF_3CF_2CF=CF_2$, $CF_3CF=CFCF_3$, $CF_3CH=CFCF_3$, $CF_2=CFCF_2CHF_2CF_3CF_2CF=CH_2$, $CF_3CH=CHCF_3$, $CF_2=CFCF_2CH_3$, $CF_2=CFCH_3CH_2CH=CH_2$, $CF_3CH=CHCH_3$, $CF_2=CHCH_2CH_3$, $CH_3CF_2CH=CH_2$, $CH=CHCFH_2$, $CH_3CF_2CH=CF_2$, $CH_2=CFCH_2CH_3$, $CF_3(CF_2)_2CF=CF_2$, $(CF_2)_3CF=CF_2$, or $CH_2=C (CH_3) COOC_2H_4C_4F_9$, $CH_2=C (CH_3) COOC_2H_4 (CF_2)_6CF (CF_3)_2CH_2=C (CH_3) COOC_2H_4C_8F_{17}$, $CH_2=C (CH_3) COOC_2H_4C_{10}F_{21}$; silicon-containing monomers such as SILAPLANE FM-0711, SILAPLANE FM-0721, SILAPLANE FM-0725, SILAPLANE TM-0701, SILAPLANE TM-0705 (all trade names, produced by Chisso Co., LTD.) and trimethoxysillylpropyl methacrylate; and further styrene, PHOSMER (tradename, produced by UNIC HEMICAL Ltd.), allyl methacrylate, allyl acrylate, phenyl methacrylate, phenyl acrylate, α-methylstyrene, p-vinyltoluene, N,N-dimethylaminoethyl acrylate, N,N-dimethylaminoethyl methacrylate, acryloyl morpholine, 1,2,2,6,6-pentamethyl-4-piperidyl methacrylate, 1,2,2,6,6-pentamethyl-4-piperidyl acrylate, 2,2,6,6-tetramethyl-4-piperidylmethacrylate, 2,2,6,6-tetramethyl-4-piperidyl acrylate, 2,3-dihydrofuran, 3,4-dihydro-2H-pyran, maleic anhydride, itaconicanhydride, maleicacidester, fumaricacid ester, acrylonitrile and methacrylonitrile. The monomers can be utilized singly or in combination of two or more members.

The polymers of polymerizable double bond-containing monomer, which is the resin of ingredient(A), are prepared by homopolymerization of the foregoing monomers, copolymerization of the mixture comprising the foregoing monomers, or copolymerization of one or more members of the foregoing monomers after homopolymerization or copolymerization of the foregoing monomers.

The polymerization method is particularly not limited. Various conventional polymerization methods such as solution polymerization in an organic solvent, suspension polymerization, emulsion polymerization, bulk polymerization and precipitation polymerization can be utilized. Also, the embodiment of the polymerization is particularly not limited. For example, radical polymerization, cation polymerization and anion polymerization can be utilized. Among this, the radical polymerization is preferable in view of industrial point. Examples of polymerization initiators used in radical polymerization are, for example, an organic peroxides such as t-butylhydro peroxide, cumenehydro peroxide, t-butylperoxy neodecanate, t-butylperoxy pivalate, t-butylperoxy benzoate, t-butylperoxy-2-ethylhexanoate, t-hexylperoxy-2-ethylhexanoate, methylethylketone peroxide; and an azo initiators such as 2,2'-azobis (2,4-dimethylvaleronitrile), 2,2'-azobis (2-methylpropionitrile) (AIBN) and 2,2'-azobis (2-methylbutironitrile). Of course, other polymerization initiators than the above described polymerization initiators can be used. The polymerization initiators can be utilized singly or in combination of two or more members.

The reaction temperature of polymerization is usually preferably 60 to 150° C. When the temperature is less than 60° C., the radical polymerizaition initiators are difficult to be decomposed and the reaction is difficult to be proceeded. When the temperature is more than 150° C., though the radical polymerizaition initiators are decomposed by heating to generate radicals, the life time of the radicals is short and a propagation reaction is difficult to be effectively proceeded. The polymerization time is indiscriminately not determined because of the influence of the polymerization temperature and the other conditions, but is generally sufficient at the level of 2 to 10 hours.

The polyester resins of ingredient(A) include that prepared by condensation reaction of a polybasic acid and a polyhydric alcohol according conventional methods.

Examples of the polybasic acid include aliphatic polycarboxylic acids of 2 to 22 carbon atoms, such as succinic acid, adipic acid, azelaic acid, sebacic acid and decamethylene-dicarboxylic acid; aromatic polycarboxylic acids, such as phthalic acid, isophathalic acid, terephathalic acid, trimellitic acid and pyromellitic acid; alicyclic polycarboxylic acids, such as tetrahydrophthalic acid and hexahydrophthalic acid; and acid anhydrides such as succinic anhydride, maleic anhydride, phthalic anhydride, tetrahrydophthalic anhydride, tetrabromophthalic anhydride, tetrachlorophthalic anhydride, hexahydrophthalic anhydride, trimellitic anhydride and pyromellitic anhydride; and further carboxyl group-containing silicone oils such as X-22-162A and X-22-162C(all trade name, products of Shin-Etsu Chemical Co., LTD.). The polybasic acids can be used singly or in combination of two or more members.

Examples of The polyhydric alcohol include alcohols such as ethylene glycol, 1,2-propylene glycol, 1,3-propylene glycol, 1,3-butanediol, 1,4-butanediol, 2,3-butanediol, 1,6-hexanediol, diethylene glycol, pentanediol dimethylbutanediol, hydrogenated bisphenol A, glycerol, sorbitol, neopentyl glycol, 1,8-octanediol, 1,4-cyclohexanedimethanol, 2-methyl-1,3-propanediol, 1,2,6-hexanetriol, 1,2,4-butanetriol, trimethylolethane, trimethylolpropane, pentaerythritol, quinitol, mannitol, tris-hydroxyethyl isocyanurate, dipentaerythritol polyethylene glycol and polypropylene glycol; addition products of the polyhydric alcohols with a lactone, such as γ-butyrolactone and ε-caprolactone, by ring opening of the lactone; addition products of the polyhydric alcohol with an isocyanate, such as tolylene diisocyanate, diphenylmethane diisocyanate, hexamethylene diisocyanate and isophorone diisocyanate, in excess amount of the alcohol; addition products of the polyhydric alcohols with a vinyl ether, such as ethylene glycol divinyl ether, polyethylene glycol divinyl ether, butanediol divinyl ether, pentanediol divinyl ether, hexanediol divinyl ether and 1,4-cyclohexanedimethanol divinyl ether, in excess amount of the alcohol; condensation products of the polyhydric alcohol with an alkoxysilicone compound, such as KR-213, KR-217 and KR-9218 (all trade names, produced by Shin-Etsu Chemical Co., LTD.), in excess amount of the alcohol; and further hydroxyl-group-containing silicone oil such as X-22-160AS and KF-6001 (all trade names, produced by Shin-Etsu Chemical Co., LTD.). Thepolyhydric alcohols canbeused singly or in combination of two or more members.

More preferable resins of ingredient(A) are polymers of a polymerizable double bond-containing monomer, which does not have a fluorine atom, furthermore preferable resins are acrylic polymers, which does not have a fluorine atom. If the resin have a fluorine atom, the surface of the substrate may be not modified to hydrophilicity by the action of water repellency based on the fluorine atom. Also, the number average molecular weight of the resin of ingredient(A) is preferably 2000 or more. When the number average molecular weight of the resin is less than 2000, the particles of the oxide may be insufficiently fixed on the surface of the substrate, and the development term of stainproof-treating effects may be decreased.

At least one oxide sol selected from the group consisting of a silica sol, an aluminum oxide sol, an antimony oxide sol, a zirconium oxide sol, a tin oxide sol and a titania sol, used as ingredient(B), is utilized to be arranged on the surface of the substrate and modify the surface of the substrate hydrophilic when the stainproof-treating agent of the present invention is applied on the substrate and the stainproof-treating agent is dried. Even if stain materials is adhered on the surface of the substrate modified to hydrophilicity, water such as rain water can permeate into the adhesion interface. Therefore, the stain materials are easily removed by natural actions such as wind and rain and the stain resistance is provided to the substrate. At least one oxide sol, selected from the group consisting of a silica sol, an aluminum oxide sol, an antimony oxide sol, a zirconium oxide sol, a tin oxide sol and a titania sol, used as ingredient (B) is formulated in the range of 0.05 to 30 percent by weight, preferably 0.1 to 25 percent by weight as nonvolatile ingredient, in the stainproof-treating agent of the present invention. When the nonvolatile ingredient is less than 0.05 percent by weight, the surface of the substrate may be not modified to hydrophilicity. When the nonvolatile ingredient is more than 30 percent by weight, the nonuniformity of the drying may be left on the surface of the substrate in drying of the stainproof-treating agent.

Examples of the oxide sol are water aqueous silica sols such as SNOWTEX 40, SNOWTEX O, SNOWTEX C and SNOWTEX N (all trade names, produced by Nissan Chemical Industries, LTD.), CATALOID S-30H, CATALOID SI-30, CATALOID SN and CATALOID SA (all trade names, produced by Catalysts & Chemicals Ind. Co., LTD.), ADELITE AT-30, ADELITE AT-20N, ADELITE AT-20A and ADELITE AT-20Q (all trade names, produced by Asahidenka INDUSTRIES, LTD.), SILICADOL-30, SILICADOL-20A and SILICADOL-20B (all trade names, produced by Nippon Chemical Industries, LTD.); organic solvent type silica sols such as SNOWTEX IPA-ST, SNOWTEX EG-ST, SNOWTEX XBA-ST and SNOWTEX MIBK-ST (all trade names, produced by Nissan Chemical Industries, LTD.), OSCAL 1132, OSCAL 1232 and OSCAL 1332 (all trade names, produced by Catalysts & Chemicals Ind. Co., LTD.); aqueous alumina sols such as ALUMINASOL-100, ALUMINASOL-200 and ALUMINASOL-520 (all trade names, produced by Nissan Chemical Industries, LTD.), ALUMINACLEARSOL, ALUMISOL-10, ALUMISOL-20, ALUMISOL SV-102 and ALUMISOL-SH5 (all trade names, produced by Kawaken Fine Chemical Industries, LTD.); water/organic solvent mixture type alumina sols such as ALUMISOL-CSA55 and ALUMISOL-CSA110AD (all trade names, produced by Kawaken Fine Chemical Industries, LTD.); aqueous antimony oxide sols such as A-1550 and A-2550 (all trade names, produced by Nissan Chemical Industries, LTD.); organic solvent type antimony oxide sols such as SUNCOLLOID ATL-130 and SUNCOLLOID AMT-130 (all trade names, produced by Nissan Chemical Industries, LTD.); aqueous zirconium oxide sols such as NZS-30A and NZS-30B (all trade names, produced by Nissan Chemical Industries, LTD.); aqueous tin oxide sols such as CELAMASE S-8 and CELAMASE C-10 (all trade names, produced by Taki Chemical Co., LTD.); aqeous titania sols such as TINOC A-6 and TINOC M-6 (all trade names, produced by Taki chemical Co., LTD.); and aqueous sol comprising a tin oxide and an antimony oxide such as CELAMASE F-10 (trade name, produced by Taki Chemical Co., LTD.); and preferably aqueous silica sols, organic solvent type silica sols, aqueous alumina sols and aqueous titania sols.

More preferable oxide sol is a oxide sol without photocatalytic action. When the substrate is an organic material and the oxide sol has photocatalytic action, the substrate may be degraded. The oxide sol without photocatalytic action includes an aqueous silica sol, an organic solvent type silica sol and an aqueous alumina sol.

The oxide sol can be utilized as it is or as a figure treated with a silane coupling agent. The hydrophilicity of the oxide particles is decreased by treating with the silane coupling agent, but the oxide particles arranged on the surface of the substrate are difficult to be removed by rain water. Therefore, the hydrophilicity of the substrate rather tends to increase.

The silane coupling agents include, for example vinyltrimethoxysilane, vinyltriethoxysilane, γ-methacryloyloxypropyltrimethoxysilane, γ-glycidoxypropyltrimethoxysilane, γ-aminopropyltrimethoxysilane, methyltrimethoxysilane methyltriethoxysilane, dimethyldimethoxysilane diphenyldimethoxysilane and phenyltrimethoxysilane. The silane coupling agent is preferably methyltrimethoxysilane, dimethyldimethoxysilane, γ-glycidoxypropyltrimethoxysilane, γ-methacryloyloxypropyltrimethoxysilane, diphenyldimethoxysilane and phenyltrimethoxysilane. Examples of commercial silane coupling agents are A-162, A-163 and AZ-6122 (all trade names, produced by NIPPON UNICAR CO., LTD.). Also, condensates of the foregoing compounds, for example, commercial KR-9218 and KR-9202 (trade names, products of Shin-Etsu Chemical Co., LTD.) can be utilized as the silane coupling agent. The silane coupling agents can be utilized singly or in combination of two or more members.

When the oxide sol is treated with the silane coupling agent, the amount of the silane coupling agent is preferably 1 to 100 percent by weight, more preferably 2 to 50 percent by weight based on the amount of nonvolatile ingredient of the oxide sol. The dispersing medium is not limited particularly and includes water, an organic solvent and a mixture of water and an organic solvent. Also, the treatment temperature is not limited particularly and usually in the range of 20 to 100° C., more preferably in the range of 30 to 90° C.

The organic solvent used as ingredient(C) is utilized to dissolve the resin of ingredient(A) in water, to decrease the surface tension of the stainproof-treating agent of the present invention and to wet and spread on the substrate homogeneously in applying the stainproof-treating agent on the substrate. The organic solvent is not limited particularly so long as the foregoing purpose can be achieved and various organic solvents can be utilized.

The organic solvent of ingredient(C) is formulated in the range of 1 to 50 percent by weight, preferably 2 to 45 percent by weight in the stainproof-treating agent of the present invention. When the amount of the organic solvent is less than 1 percent by weight, the resin of ingredient(A) may be not dissolved. When the amount of the organic solvent is more than 50 percent by weight, the amount of the organic solvent which volatilizes in using the stainproof-treating agent is increased and a special device may be required.

The organic solvents include, for example, aliphatic hydrocarbons such as n-hexane, n-heptane and n-octane; aromatic hydrocarbons such as benzene, toluene and xylene; halogenated hydrocarbons such as chloroform and carbon tetrachloride; alcohols such as methyl alcohol, ethyl alcohol, n-propyl alcohol, isopropyl alcohol, n-butyl alcohol and ethylene glycol; ethers such as dibutyl ether, tetrahydrofuran, 1,4-dioxane, ethyleneglycol monoethyl ether and ethyleneglycol mono-n-propyl ether; ketones such as acetone, methyl ethyl ketone, methyl isobutyl ketone and cyclohexanone; esters such as ethyl acetate, n-propyl acetate and n-butyl acetate; and further N,N-dimethyl formamide and N,N-dimethyl acetamide, preferably aromatic hydrocarbons, alcohols, ethers and ketones, more preferably alcohols. The organic solvents can be utilized singly or in a combination of two or more members.

Water of ingredient(D) is formulated in the range of 40 to 99 percent by weight, preferably 45 to 95 percent by weight.

The stainproof-treating agent of the present invention is characterized in that a curing agent is not contained in the composition. Therefore, the stainproof-treating agent of the present invention does not increase the viscosity and gel in storage. Further, because curing agent is not contained in the stainproof-treating agent, the applied stainproof-treating agent is easily removed from the stainproof-treated article applied with the stainproof-treating agent of the present invention. When the applied stainproof-treating agent is difficult to remove, wrong something may occur in applying a paint on the surface of the substrate and in recycling the substrate.

The method for mixing each ingredients in preparing the stainproof-treating agent of the present invention, is not limited particularly and is performed by various methods. The order of the mixing is performed by various orders.

The stainproof-treating agent of the present invention can be utilized in various uses.

The method for stainproof-treating of the present invention is performed by applying the stainproof-treating agent of the present invention on the substrate and then by drying the substrate.

The application of the stainproof-treating agent is performed by simple coating machines such as paper, cloth, sponge, atomizer, brush, bar coater or applicator. The application to a large substrate is performed by conventional coating machines such as air spray, airless spray, roll coater, flow coater, dip type coating machine and the like.

Also, the stainproof-treating agent of the present invention can be utilized in forms such as a wet tissue and a wet towel in which the stainproof-treating agent is impregnated into the paper or the nonwoven cloth.

The application amount of the stainproof-treating agent is not limited particularly so long as the substrate is coated and usually in the range of 1 to 5000 $g/m^2$, preferably 2 to 4000 $g/m^2$.

The substrates used in the method for stainproof-treating of the present invention are not limited particularly and include various substrates, for example, organic or inorganic substrate materials, such as woods, glasses, metals, cloths, plastics, foamed articles, elastomers, papers, ceramics, concretes and gypsum boards. The surface of the substrates may be treated or coated with paint film. The paint film is not limited particularly and includes various paint films such as organic paint films, inorganic paint films and organic/inorganic composite paint films.

The drying can be performed by various drying methods such as air drying and drying with air blowing, and preferably air drying. The air drying means to leave the substrate at room temperature till the moisture on the substrate is vaporized. The drying temperature is not limited particularly, and usually preferably in the range of 2 to 50° C., more preferably 5 to 40° C. The air blowing rate in drying with air blowing is not limited particularly, and preferably in the range of 0.01 to 100 m/sec.

The method for stainproof-treating of the present invention is preferably performed by washing the substrate with water after applying the stainproof-treating agent on a substrate, and then drying the substrate. By washing with water, the stainproof-treating agent is applied and spread on all surface of the substrate homogeneously or almost homogeneously, the excess stainproof-treating agent is removed. The excess stainproof-treating agent means the stainproof-treating agent in the amount that the appearance of the substrate is damaged after stainproof-treating. When the washing with water is not performed, the nonuniformity of the drying may be left on the surface of the substrate. The surface of the substrate is modified to hydrophilicity in the step of application of the stainproof-treating agent. Therefore, after washing with water, water droplet does not occur on the surface of the substrate and working for wiping out is not required. But, for the purpose that the stainproof-treating is finished in more short time, working for wiping out water remained on the surface of the substrate or drying with air blowing can be performed.

The washing with water can be performed by various methods, such as a method for washing the substrate applied with the stainproof-treating agent under flowing water and a method for dipping the substrate into a water tank. As the flowing water, the flowing waters obtained by various methods such as curtain flow, spray, shower and hose can be utilized.

The temperature of washing with water is not limited particularly, and usually preferably in the range of 2 to 50° C.

More preferable method for stainproof-treating of the present invention is performed by applying the stainproof-treating agent by sprinkling on an external panel of automobile after automobile-washing work, in a process for washing an automobile by an automobile washing device, and washing the substrate with water by water sprinkling and then last drying the substrate by air blowing.

On the external panel of automobile, paint film is usually formed. The kind of the paint film is not limited particularly. The method for stainproof-treating of the present invention can be applied to various paint films.

The automobile washing device is not limited particularly so long as a mean for washing the external panel of automobile is equipped and includes, for example, an automatic automobile washing device equipped with a brush for washing, a mean for sprinkling water, a mean for sprinkling a treating agent, an air blower and a mean for driving these means. The treating agent includes a detergent, an abrasive agent, an polishing agent and a water repellent agent. The treating agent can be sprinkled as it is or as a figure diluted with water.

The application amount of the stainproof-treating agent by sprinkling is not limited particularly so long as the surface of the automobile is coated and usually in the range of 10 to 6000 $g/m^2$, preferably 20 to 5000 $g/m^2$. The sprinkling can be performed by using a mean for sprinkling water or a mean for sprinkling the treating agent and also can be performed by using a special nozzle and the like.

The temperature of washing with water by sprinkling water after application of the stainproof-treating agent, the temperature of drying by air blowing and the air blowing rate in drying with air blowing are similar to that described above. The sprinkling of water can be performed by shower and the like.

Another more preferable method for stainproof-treating of the present invention is a method for stainproof-treating which comprises, in a process for obtaining a cured article of a thermosetting composition, cooling the cured article by using the stainproof-treating agent as a cooling liquid in cooling after heating and curing the thermosetting composition.

The thermosetting composition is not limited particularly and various thermosetting compositions can be utilized. The temperature of the stainproof-treating agent of the present invention used as the cooling liquid is not limited particularly so long as the temperature is lower than the temperature of the heated and cured material, and usually in the range of 0 to 100° C., more preferably 0 to 50° C., most preferably 5 to 35° C. The temperature of the cured material after cooling is not limited particularly so long as the temperature is lower than the temperature of the heated and cured material and is normally 30° C. or more lower than the temperature of the heated and cured material, preferably 60° C. or more lower than the temperature of the heated and cured material, more preferably 100° C. or more lower than the temperature of the heated and cured material.

The cooling method is not limited particularly so long as the stainproof-treating agent of the present invention is used, and includes various cooling methods such as a cooling method which comprises cooling by applying the stainproof-treating agent of the present invention on the heated and cured material by spray and the like and a cooling method which comprises cooling by dipping the cured material in a bath containing the stainproof-treating agent of the present invention. After the method for stainproof-treating, operations such as washing with water and/or drying by air blowing and the like may be performed. The conditions of washing with water or drying are similar to that of the method for stainproof-treating described above.

Further, another more preferable method for stainproof-treating of the present invention is a method for stainproof-treating which comprises, in a process for obtaining a formed article of a thermoplastic composition, cooling the formed article by using the stainproof-treating agent as a cooling liquid in cooling after heat forming of the thermoplastic composition. The thermoplastic composition is not limited particularly and various thermoplastic compositions can be utilized. The formed article includes various formed articles such as cube, hollow article, linear article and film. The heat forming includes various forming for heat forming, such as injection molding, extrusion, pressure molding, heat film forming and heat drawing. The temperature of the stainproof-treating agent of the present invention used as the cooling liquid is the same as described above. The temperature of the formed article or the film after cooling is the same as described above. Also, the cooling method is not limited particularly so long as the stainproof-treating agent of the present invention is utilized and the same cooling methods as described above can be utilized. After the method for stainproof-treating, operations such as washing with water and/or drying by air blowing and the like may be performed. The conditions of washing with water or drying are similar to that of the method for stainproof-treating described above.

Stainproof-treated articles obtained by the method for stainproof-treating of the present invention Include structures, wood articles, metallic articles, plastics articles, rubber articles, coated papers, ceramic articles and glass articles, specifically automobiles, parts for automobiles (for example, body, bumper, spoiler, mirror, wheel and inner package material, and these parts are made of various materials), metal plates such as steel plates, two-wheel vehicles, parts for two-wheel vehicles, materials for road (for example, guardrail, traffic control sign and sound-proof wall), materials for tunnel (for example, side wall plate), marine vessels, railway vehicles, airplanes, furniture, musical instruments, house-hold electric instruments, building materials, vessels, office articles, sport articles and toys.

EXAMPLES

Next, the invention is explained in detail with reference to the following Examples. However, these Examples are intended to illustrate the invention and are not to be construed to limit the scope of the invention.

The properties of the stainproof-treated article obtained by the method for stainproof-treating of the present invention were measured as follows.

(1) Appearance

The appearance was evaluated by visual observation according to The following standard.
○: nonuniformities of the drying of the stainproof-treating agent were not left.
Δ: A little of nonuniformity of the drying of the stainproof-treating agent is left.
X: nonuniformities of the drying of the stainproof-treating agent were left remarkably.

(2) Hydrophilicity

The measurement of water contact angle was carried out by using a goniometer type measuring device of contact angle produced by Elma Co., LTD. As the value is smaller, the hydrophilicity is higher.

(3) Stain Resistance

The atmospheric exposure test of test piece was conducted for 30 days or further 60 days according to needs and the color of unwashed surface of the stainproof-treated article was measured according to the measurement method of Japanese Industrial Standard K-5400 (1990) 9.9 weathering resistance. Stain resistance was evaluated by a difference ($\Delta L$) which is calculated by subtracting initial L value before the atmospheric exposure from L value after the atmospheric exposure. As the $\Delta L$ value is nearer to 0, the stainproof-treated article is more excellent in stain resistance.

Preparation Example 1

Preparation of Resin Solution A-1 of Ingredient (A)

Into a four-necked flask equipped with a thermometer, a reflux condenser, a stirrer and a dropping funnel, 49.0 parts by weight of n-butyl alcohol and 10.0 parts by weight of cyclohexanone were charged and the mixture was heated until the temperature reached to 115° C. and maintain the temperature. To the mixture kept at 115° C., the mixture of 36.7 parts by weight of methyl methacrylate, 31.4 parts by weight of ethyl methacrylate, 31.9 parts by weight of ε-caprolactone 2 mole adduct of 2-hydroxyethyl methacrylate and 4.5 parts by weight of t-butylperoxy-2-ethylhexanoate was added by dropping for 2 hours while holding reflux condition. The mixture was kept stirring at 115° C. for 30 minutes after the end of the dropping. And then 0.5 parts by weight of t-butylperoxy-2-ethylhexanoate was added to the mixture and the mixture was kept stirring at 115° C. for further 2 hours. After finishing the polymerization, resin solution A-1 containing 64.0 percent by weight of nonvolatile ingredient was obtained.

The obtained resin contained hydroxyl groups and the total amount of hydroxyl groups was 0.9 mole per 1000 g of the resin. Also, the obtained resin had a number average molecular weight of 5000 and a solubility parameter value measured by method A of 11.47. And the obtained resin was insoluble in water at 25° C.

Preparation Example 2

Preparation of Resin Solution A-2 of Ingredient (A)

Into a four-necked flask equipped with a thermometer, a reflux condenser, a stirrer, a water-separating device and a fractionating column, 20.0 parts by weight of neopentyl glycol, 15.0 parts by weight of 1,6-hexanediol, 6.5 parts by weight of trimethylolpropane and 26.0 parts by weight of ε-caprolactone were charged and the mixture was heated until the temperature reached to 100° C. After the raw material was fused and could be stirred, 57.0 parts by weight of isophthalic acid was charged into the mixture and the mixture was heated until the temperature reached to 180° C. And then the mixture was heated at the constant heating rate for 3 hours until the temperature reached to 230° C. Produced condensation water was distilled out of the system. After stirring at 230° C. for 3 hours, 5.0 parts by weight of xylene was gradually added to the mixture and the reaction was exchanged to the reaction under solvent. The reaction was finished at the time that the acid value reached to 7.0 mgKOH/g. The reaction product was cooled to 100° C. and 54.0 parts by weight of n-butyl alcohol was added in the reaction product to obtain polyester resin solution A-2 containing 65.0 percent by weight of nonvolatile ingredient.

The obtained resin contained hydroxyl groups and carboxyl groups and the total amount of hydroxyl groups and carboxyl groups was 1.0 mole per 1000 g of the resin. Also, the obtained resin had a number average molecular weight of 4000 and a solubility parameter value measured by method A of 10.72. And the obtained resin was insoluble in water at 25° C.

Preparation Example 3
Preparation of Resin Solution A-3 of Ingredient (A)

Into a four-necked flask equipped with a thermometer, a reflux condenser, a stirrer and a dropping funnel, 48.7 parts by weight of isopropyl alcohol was charged and the liquid was heated until the reflux condition and maintain the condition. To the liquid, the mixture of 18.0 parts by weight of 2-hydroxypropyl methacrylate, 6.0 parts by weight of styrene, 3.0 parts by weight of methacrylamide, 3.0 parts by weight of N,N-dimethylaminoethyl methacrylate, 0.2 parts by weight of 2,2'-azobis (2-methylbutironitrile) and 20.0 parts by weight of isopropyl alcohol was added by dropping for 2 hours while holding reflux condition. The mixture was kept stirring for 30 minutes after the end of the dropping while holding reflux condition. And then a mixture of 0.1 parts by weight of 2,2'-azobis (2-methylbutironitrile) and 1.0 parts by weight of isopropyl alcohol was added to the mixture and the mixture was kept stirring under reflux condition for further 2 hours. After finishing the polymerization, resin solution A-3 containing 31.0 percent by weight of nonvolatile ingredient was obtained.

The obtained resin contained hydroxyl groups and amide groups and the total amount of hydroxyl groups and amide groups was 5.3 mole per 1000 g of the resin. Also, the obtained resin had a number average molecular weight of 11000 and a solubility parameter value measured by method B of 11.94. And the obtained resin was insoluble in water at 25° C.

Preparation Example 4
Preparation of Resin Solution A-4 of Ingredient (A)

Into a four-necked flask equipped with a thermometer, a reflux condenser, a stirrer and a dropping funnel, 48.7 parts by weight of isopropyl alcohol was charged and the liquid was heated until the reflux condition and maintain the condition. To the liquid, the mixture of 15.0 parts by weight of 2-hydroxyethyl methacrylate, 6.0 parts by weight of acrylic acid, 9.0 parts by weight of methyl methacrylate, 0.2 parts by weight of 2,2 '-azobis (2-methylbutironitrile) and 20.0 parts by weight of isopropyl alcohol was added by dropping from the dropping funnel for 2 hours while holding reflux condition. The mixture was kept stirring for further 30 minutes after the end of the dropping while holding reflux condition. And then the mixture of 0.1 parts by weight of 2,2'-azobis (2-methylbutironitrile) and 1.0 parts by weight of isopropyl alcohol was added to the mixture and the mixture was kept stirring under reflux condition for further 2 hours. After finishing the polymerization, resin solution A-4 containing 30.5 percent by weight of nonvolatile ingredient was obtained.

The obtained resin contained hydroxyl groups and carboxyl groups and the total amount of hydroxyl groups and carboxyl groups was 6.6 mole per 1000 g of the resin. Also, the obtained resin had a number average molecular weight of 9800 and a solubility parameter value measured by method B of 12.52. And the obtained resin was insoluble in water at 25° C.

Preparation Example 5
Preparation of Oxide sol B-1 of Ingredient (B)

Into a flask equipped with a thermometer, a reflux condenser and a stirrer, 100.0 parts by weight of SNOWTEX IPA-ST (trade name, silica sol produced by Nissan chemical Industries, LTD., average particle diameter: 10–15 rim, nonvolatilematter:30 percent by weight, solvent: isopropyl alcohol), non-volatile material: 30 percent by weight, solvent:methylisobutyl ketone) and 4.0 parts by weight of A-163 (trade name, silane coupling agent produced by Nippon Unicar Co., LTD.) were charged and the mixture was heated and kept at 80° C. for 8 hours. The resultant silica sol B-1 surface-treated with the silane coupling agent was obtained in 102.0 parts by weight.

Examples 1 Through 6
(1) Preparation of Stainproof-treating Agents

Stainproof-treating agents were prepared by mixing raw materials in formulated ratio shown in Table 1 and Table 2.

(2) Preparation of Test Pieces and Property Tests

Cationic electrodeposition coat, AQUA No. 4200 (trademark, produced by NOF CORPORATION) was applied by electrodeposition to a soft steel plate treated with zinc phosphate(length 30 cm×breadth 10 cm) in an amount to form a film having dried thickness of 20 $\mu$m and the coated plate was baked at 175° C. for 25 minutes. Intermediate coat HI-EPICO No. 500 (trademark, produced by NOF CORPORATION) was applied to the prepared plate by air spraying in an amount to form a film having dried thickness of 30 $\mu$m and the plate was baked at 140° C. for 30 minutes. Further, MELAMI No. 2000polawhite (trademark, produced by NOF CORPORATION) was applied to the prepared plate by air spraying in an amount to form a film having dried thickness of 3 $\mu$m and the plate was baked at 140° C. for 30 minutes to obtain a substrate.

The stainproof-treating agents prepared in above mentioned (1) were respectively applied homogeneously on the substrate by atomizer. The substrates were washed with water homogeneously under flowing water of 18° C. and then was dried in air under windless condition at 20° C. to obtain a test piece.

Results of the property tests are shown in Table 1 and Table 2. In all cases, the stainproof-treated substrates had excellent appearance, high hydrophilicity and excellent stain resistance.

TABLE 1

| | | | Example | | |
|---|---|---|---|---|---|
| | | | 1 | 2 | 3 |
| Formulation (parts by weight) | Ingredient (A) | A-1 | 15.6 | — | 6.3 |
| | | A-2 | — | 3.1 | — |
| | Ingredient (B) | B-1 | 31.3 | — | — |
| | | B-2 1) | — | 60.0 | — |
| | | B-3 2) | — | — | 66.7 |
| | Ingredient (C) | Ethyl alcohol | — | 20.0 | 20.0 |
| | | Isopropyl alcohol | 8.0 | — | — |
| | Ingredient (D) | Water | 45.0 | 16.9 | 7.0 |
| Ingredient concentration (% by weight) | Nonvolatile Ingredient (A) | A-1 | 10.0 | — | 4.0 |
| | | A-2 | — | 2.0 | — |
| | Nonvolatile Ingredient (B) | B-1 | 10.0 | — | — |
| | | B-2 1) | — | 6.0 | — |
| | | B-3 2) | — | — | 4.0 |
| | Ingredient (C) | Ethyl alcohol | — | 20.0 | 20.0 |
| | | Isopropyl alcohol | 29.3 | — | — |
| | | n-butyl alcohol | 4.7 | 1.0 | 1.9 |

TABLE 1-continued

|  |  |  | Example | | |
|---|---|---|---|---|---|
|  |  |  | 1 | 2 | 3 |
| Ingredient (D) | | Xylene | — | 0.1 | — |
| | | Cyclohexanone | 1.0 | — | 0.4 |
| | | Water | 45.0 | 70.9 | 69.7 |
| Results of property tests | | Appearance | ○ | ○ | ○ |
| | | Hydrophilicity(°) | 29 | 41 | 15 |
| | | Stain resistance After 30 days exposure | −0.7 | −1.1 | −0.5 |
| | | After 60 days exposure | −1.9 | −2.5 | −3.0 |

TABLE 2

|  |  |  | Example | | |
|---|---|---|---|---|---|
|  |  |  | 1 | 2 | 3 |
| Formulation (parts by weight) | Ingredient (A) | A-3 | 23.3 | — | — |
| | | A-4 | — | 6.6 | 13.1 |
| | Ingredient (B) | B-1 | — | 20.0 | — |
| | | B-4 3) | 50.0 | — | — |
| | | B-2 1) | — | — | 40.0 |
| | Ingredient (C) | Ethyl alcohol | — | 3.4 | 15.0 |
| | | Isopropyl alcohol | 11.7 | — | — |
| | Ingredient (D) | Water | 6.0 | 70.0 | 31.9 |
| Ingredient concentration (% by weight) | Nonvolatile Ingredient (A) | A-3 | 10.0 | — | 4.0 |
| | | A-4 | — | 2.0 | — |
| | Nonvolatile Ingredient (B) | B-1 | — | 6.0 | — |
| | | B-4 3) | 10.0 | — | — |
| | | B-2 1) | — | — | 4.0 |
| | Ingredient (C) | Ethyl alcohol | — | 3.4 | 15.0 |
| | | Isopropyl alcohol | 34.0 | 18.6 | 9.1 |
| | Ingredient (D) | Water | 46.0 | 70.0 | 67.9 |
| Results of property tests | | Appearance | ○ | ○ | ○ |
| | | Hydrophilicity (°) | 37 | 25 | 28 |
| | | Stain resistance After 30 days exposure | −1.0 | −0.6 | −0.8 |
| | | After 60 days exposure | −1.0 | −0.7 | −1.2 |

Notes
1) B-2: ALUMISOL-10 (trade name, alumina sol produced by Kawakenn Fine Chemical, LTD., nonvolatile matter: 10 percent, solvent: water)
2) B-3: TINOC M-6 (trade name, titania sol produced by Taki Chemical Co., LTD., nonvolatile matter: 6 percent, solvent: water)
3) B-4: SNOWTEX C (trade name, silica sol produced by Nissan Chemical Industries, LTD., nonvolatile matter: 20 percent, solvent: water)

Comparative Examples 1 Through 5

Test pieces were prepared in the same method as described in Examples 1 through 6 except that stainproof-treating was not conducted in Comparative Example 1, and stainproof-treating was performed by applying respectively 10 g of the stainproof-treating agents prepared in formulation ratio shown in Table 3 on the substrates homogeneously by atomizer and washing all surfaces of the substrate with water under flowing water of 18° C. and then drying in air under windless condition at 20° C. in Comparative Examples 2 and 5 to obtain test pieces.

Results of the property tests are shown in Table 3. All test pieces were not high in hydrophilicity of the surfaces and inferior in stain resistance, because any stainproof-treating was not conducted in Comparative Example 1, and any resin of ingredient(A) was not formulated in the stainproof-treating agent in Comparative Examples 2 and 4, and any oxide sol of ingredient(B) was not formulated in the stainproof-treating agent in Comparative Examples 3 and 5.

TABLE 3

|  |  |  | Comparative Example | | | | |
|---|---|---|---|---|---|---|---|
|  |  |  | 1 | 2 | 3 | 4 | 5 |
| Formulation (parts by weight) | Ingredient (A) | A-1 | — | — | 15.6 | — | — |
| | | A-4 | — | — | — | — | 6.6 |
| | Ingredient (B) | B-1 | — | 31.3 | — | 20.0 | — |
| | Ingredient (C) | Ethyl alcohol | — | 4.7 | — | 3.4 | 3.4 |
| | | Isopropyl alcohol | — | 8.0 | 29.3 | 4.6 | 14.0 |
| | | Cyclohexanone | — | 1.0 | — | — | — |
| | Ingredient (D) | Water | — | 55.0 | 55.0 | 72.0 | 76.0 |
| Ingredient concentration (% by weight) | Nonvolatile Ingredient (A) | A-1 | — | — | 10.0 | — | — |
| | | A-4 | — | — | — | — | 2.0 |
| | Nonvolatile Ingredient (B) | B-1 | — | 10.0 | — | 6.0 | — |
| | Ingredient (C) | Ethyl alcohol | — | — | — | 3.4 | 3.4 |
| | | Isopropyl alcohol | — | 29.3 | 29.3 | 18.6 | 18.6 |
| | | n-butyl alcohol | — | 4.7 | 4.7 | — | — |
| | | Cyclohexanone | — | 1.0 | 1.0 | — | — |
| | Ingredient (D) | Water | — | 55.0 | 55.0 | 72.0 | 76.0 |
| Results of property tests | | Appearance | ○ | ○ | ○ | ○ | ○ |
| | | Hydrophilicity | 79 | 75 | 69 | 75 | 70 |

TABLE 3-continued

|  |  | Comparative Example | | | | |
| --- | --- | --- | --- | --- | --- | --- |
|  |  | 1 | 2 | 3 | 4 | 5 |
| (°) Stain resistance | After 30 days exposure | −9.7 | −9.4 | −8.8 | −9.4 | −9.1 |

Example 7

Cationic electrodeposition coat, AQUA No. 4200 (trademark, produced by NOF CORPORATION) was applied by electrodeposition to a soft steel plate treated with zinc phosphate in an amount to form a film having dried thickness of 20 μm and the coated plate was baked at 175° C. for 25 minutes. Next, intermediate coat, HI-EPICO No. 500 (trademark, produced by NOF CORPORATION) was applied by air spraying to the prepared plate in an amount to form a film having dried thickness of 30 μm and the plate was baked at 140° C. for 30 minutes. Further, MELAMI No. 2000 polawhite (trademark, thermosetting type top coat produced by NOF CORPORATION) was applied to the prepared plate by air spraying in an amount to form a film having dried thickness of 30 μm and the plate was baked at 140° C. for 30 minutes to obtain a paint film of the heated and cured material. In cooling the paint film of the heated and cured material of 140° C., the heated and cured material was cooled by applying the stainproof-treating agent of Example 1 (at 20° C.) homogeneously on the heated and cured material by air spray to perform the stainproof-treating. After cooling, the temperature of the cured material was 60° C.

All surfaces of the substrate of the cured material were washed with water homogeneously under flowing water of 18° C. and then was dried in air under windless condition at 20° C. to obtain a steel plate coated with paint film.

Results of the property tests are shown in Table 4. Excellent appearance, high hydrophilicity and excellent stain resistance are shown.

Example 8

A steel plate coated with paint film were prepared in the same method as described in Example 7 except that the stainproof-treating agent of Example 4 was used instead of the stainproof-treating agent of Example 1, in Example 7.

Results of the property tests are shown in Table 4. Excellent appearance, high hydrophilicity and excellent stain resistance are shown.

Example 9

On a SUS 304 stainless steel plate (plate thickness:0.5 mm), an applying type chromating was applied and then epoxy resin type PRIMER PRECOLOR WP-3 (trademark, produced by NOF CORPORATION) was applied by roll in an amount to form a film having dried thickness of 5 μm and the coated plate was baked at the reached temperature of 220° C. for 60 seconds. Further, PRECOLOR No. 8000 white (trademark, thermoplastic fluororesin type top coat produced by NOF CORPORATION) was applied to the prepared plate by roll in an amount to form a film having dried thickness of 20 μm and the plate was baked at the reached temperature of 220° C. for 60 seconds to obtain a coated material. In cooling the coated material of 220° C., the coated material was cooled by dipping in a bath containing the stainproof-treating agent of 20° C. described in Example 2 to conduct the stainproof-treating.After cooling, the temperature of the coated material was 40° C.

The coated material was dried by air blowing under condition of air blowing rate of 1 m/sec at 20° C. to obtain a test piece.

Results of the property tests are shown in Table 4. Excellent appearance, high hydrophilicity and excellent stain resistance are shown.

Example 10

A steel plate coated with paint film was prepared in the same method as described in Example 9 except that the stainproof-treating agent of Example 5 was used instead of the stainproof-treating agent of Example 2, in Example 9.

Results of the property tests are shown in Table 4. Excellent appearance, high hydrophilicity and excellent stain resistance are shown.

TABLE 4

|  |  | Example | | | |
| --- | --- | --- | --- | --- | --- |
|  |  | 7 | 8 | 9 | 10 |
| Stainproof-treating agent |  | Example 1 | Example 4 | Example 2 | Example 5 |
| Results of property tests | Appearance | ◯ | ◯ | ◯ | ◯ |
|  | Hydrophilicity (°) | 25 | 31 | 41 | 29 |
|  | Stain resistance After 30 days exposure | −0.5 | −0.8 | −1.0 | −0.8 |

Comparative Example 6

A steel plate coated with paint film was prepared in the same method except that the coated plate was cooled by dipping in a vessel containing water of 20° C. instead of the stainproof-treating agent, in Example 8.

Results of the property tests are shown in Table 5. The hydrophilicity of the surface is not high and the stain resistance is inferior.

TABLE 5

|  |  | Compartive Example 6 |
| --- | --- | --- |
| Results of property tests | Appearance | ◯ |
|  | Hydrophilicity (°) | 85 |
|  | Stain resistance After 30 days exposure | −12.3 |

Example 11

Automobile having an outside plate coated with the same thermosetting paint film as Examples 1 to 6 was washed by an automatic washing device for automobile equipped with a brush for washing, a mean for sprinkling water, a mean for sprinkling a detergent, an air blower and a mean for driving these means. And then on the external panel of automobile, the stainproof-treating agent of Example 1 was applied by sprinkling in the ratio of about 50 g/m² from a nozzle for sprinkling the detergent and next water of 25° C. was sprinkled homogeneously by shower from the sprinkler nozzle to wash the outside plate with water. Following it, air of 30° C. was blown in the rate of 20 m/sec to dry the outside plate. The external panel of automobile had excellent appearance, high hydrophilicity and excellent stain resistance like Example 1.

Example 12

The external panel of automobile was stainproof-treated in the same method as described in Example 11 except that the stainproof-treating agent of Example 4 was used instead of the stainproof-treating agent of Example 1, in Example 11.

The external panel of automobile had excellent appearance, high hydrophilicity and excellent stain resistance like Example 4.

The stainproof-treating agent of the present invention can be applied on a substrate without requiring a special device and can provide stain resistance to the substrate by modifying the surface of the substrate hydrophilic by simple working. The method for stainproof-treating of the present invention is a method by using the stainproof-treating agent described above and can provide excellent stain resistance to the substrate by simple working. Further, the stainproof-treated article of the present invention is a stainproof-treated article treated by the method for stainproof-treating of the present invention and is excellent in stain resistance.

What is claim is:

1. A stainproof-treating agent which comprises (A) 0.05 to 30 percent by weight of a nonvolatile resin ingredient, (B) 0.05 to 30 percent by weight of a nonvolatile ingredient of at least one oxide sol selected from the group consisting of a silica sol, an aluminum oxide sol, an antimony oxide sol, a zirconium oxide sol, a tin oxide sol and a titania sol, (C) 1 to 50 percent by weight of an organic solvent and (D) 40 to 99 percent by weight of water, wherein the resin of the ingredient (A) has a solubility parameter value of 10 or more and is insoluble in water at 25° C.

2. The stainproof-treating agent as claimed in claim 1, wherein the resin of ingredient (A) has at least one hydrophilic functional group selected from the group consisting of hydroxyl group, carboxyl group, amino group, imino group and amide group and the total amount of the hydrophilic functional group is 4 or more mole per 1000 g of the resin.

3. The stainproof-treating agent as claimed in claim 1, wherein the resin of ingredient (A) is a polymer of a polymerizable double bond-containing monomer, which does not have a fluorine atom, and has an average molecular weight of 2000 or more.

4. The stainproof-treating agent as claimed in claim 2, wherein the resin of ingredient (A) is a polymer of a polymerizable double bond-containing monomer, which does not have a fluorine atom, and has an average molecular weight of 2000 or more.

5. The stainproof-treating agent as claimed in claim 1 wherein the oxide sol of ingredient (B) is treated with a silane coupling agent.

6. The stainproof-treating agent as claimed in claim 2 wherein the oxide sol of ingredient (B) is treated with a silane coupling agent.

7. The stainproof-treating agent as claimed in claim 3, wherein the oxide sol of ingredient (B) is treated with a silane coupling agent.

8. The stainproof-treating agent as claimed in claim 4, wherein the oxide sol of ingredient (B) is treated with a silane coupling agent.

9. A method for stainproof-treating comprising:
    applying a stainproof-treating agent to a substrate, said stainproof-treating agent includes:
        (A) 0.05 to 30 percent by weight of a nonvolatile resin ingredient;
        (B) 0.05 to 30 percent by weight of a nonvolatile ingredient of at least one oxide sol being a member selected from the group consisting of a silica sol, an aluminum oxide sol, an antimony oxide sol, a zirconium oxide sol, a tinoxide sol and a titania sol;
        (C) 1 to 50 percent by weight of an organic solvent; and
        (D) 40 to 99 percent by weight of water, wherein the resin of the ingredient (A) has a solubility parameter value of 10 or more and is insoluble in water at 25° C.; and
    drying the substrate.

10. The method for stainproof-treating as claimed in claim 9, wherein after applying the stainproof-treating agent on the substrate, the substrate is washed with water and then dried.

11. A stainproof-treated article which is treated by the method as claimed in claim 9.

12. A method for stainproof-treating comprising:
    washing an automobile by an automobile washing device;
    applying a stainproof-treating agent by sprinkling said stainproof-treating agent onto an external panel of a washed automobile, said stainproof-treating agent includes:
        (A) 0.05 to 30 percent by weight of a nonvolatile resin ingredient;
        (B) 0.05 to 30 percent by weight of a nonvolatile ingredient of at least one oxide sol being a member selected from the group consisting of a silica sol, an aluminum oxide sol, an antimony oxide sol, a zirconium oxide sol, a tinoxide sol and a titania sol;
        (C) 1 to 50 percent by weight of an organic solvent; and
        (D) 40 to 99 percent by weight of water, wherein the resin of the ingredient (A) has a solubility parameter value of 10 or more and is insoluble in water at 25° C.;
    sprinkling water on said automobile; and
    drying said treated automobile by air blowing.

13. The method as claimed in claim 12 wherein said resin of ingredient (A) has at least one hydrophilic functional group selected from the group consisting of hydroxyl group, carboxyl group, amino group, imino group, and amide group and the total amount of the hydrophilic functional group is 4 or more mole per 1000 g of the resin.

14. The method as claimed in claim 13 wherein said resin of ingredient (A) is a polymer of a polymerizable double bond-containing monomer, which does not have a fluorine atom, and has an average molecular weight of 2000 or more.

15. The method as claimed in claim 14 wherein the oxide sol of ingredient (B) is treated with a silane coupling agent.

16. A stainproof-treated article which is treated by the method as claimed in claim 12.

17. A method for stainproof-treating comprising:
    for obtaining a cured article of a thermosetting composition;
    cooling said cured article by using a stainproof-treating agent as a cooling liquid after heating, said stainproof-treating agent includes:

(A) 0.05 to 30 percent by weight of a nonvolatile resin ingredient;

(B) 0.05 to 30 percent by weight of a nonvolatile ingredient of at least one oxide sol being a member selected from the group consisting of a silica sol, an aluminum oxide sol, an antimony oxide sol, a zirconium oxide sol, a tinoxide sol and a titania sol;

(C) 1 to 50 percent by weight of an organic solvent; and (D) 40 to 99 percent by weight of water, wherein the resin of the ingredient (A) has a solubility parameter value of 10 or more and is insoluble in water at 25° C.; and curing the thermosetting composition.

18. The method as claimed in claim 17 wherein said resin of ingredient (A) has at least one hydrophilic functional group selected from the group consisting of hydroxyl group, carboxyl group, amino group, imino group, and amide group and the total amount of the hydrophilic functional group is 4 or more mole per 1000 g of the resin.

19. The method as claimed in claim 18 wherein said resin of ingredient (A) is a polymer of a polymerizable double bond-containing monomer, which does not have a fluorine atom, and has an average molecular weight of 2000 or more.

20. The method as claimed in claim 19 wherein the oxide sol of ingredient (B) is treated with a silane coupling agent.

21. A stainproof-treated, cured thermoset article which is treated by the method as claimed in claim 17.

22. A method for stainproof-treating comprising:

obtaining a formed article of a thermoplastic composition; and cooling said formed article by using a stainproof-treating agent as a cooling liquid after heat forming of said thermoplastic composition, said stainproof-treating agent includes:

(A) 0.05 to 30 percent by weight of a nonvolatile resin ingredient;

(B) 0.05 to 30 percent by weight of a nonvolatile ingredient of at least one oxide sol being a member selected from the group consisting of a silica sol, an aluminum oxide sol, an antimony oxide sol, a zirconium oxide sol, a tinoxide sol and a titania sol;

(C) 1 to 50 percent by weight of an organic solvent; and (D) 40 to 99 percent by weight of water, wherein the resin of the ingredient (A) has a solubility parameter value of 10 or more and is insoluble in water at 25° C.

23. The method as claimed in claim 22 wherein said resin of ingredient (A) has at least one hydrophilic functional group selected from the group consisting of hydroxyl group, carboxyl group, amino group, imino group, and amide group and the total amount of the hydrophilic functional group is 4 or more mole per 1000 g of the resin.

24. The method as claimed in claim 23 wherein said resin of ingredient (A) is a polymer of a polymerizable double bond-containing monomer, which does not have a fluorine atom, and has an average molecular weight of 2000 or more.

25. The method as claimed in claim 24 wherein the oxide sol of ingredient (B) is treated with a silane coupling agent.

26. A stainproof-treated thermoplastic article which is treated by the method as claimed in claim 22.

* * * * *